US010739154B2

(12) United States Patent
Zhou et al.

(10) Patent No.: US 10,739,154 B2
(45) Date of Patent: Aug. 11, 2020

(54) SYSTEM AND METHOD FOR VEHICLE FUEL CONSUMPTION OPTIMIZATION

(71) Applicant: SAP SE, Walldorf (DE)

(72) Inventors: Wenjun Zhou, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 52 days.

(21) Appl. No.: 15/013,213

(22) Filed: Feb. 2, 2016

(65) Prior Publication Data

US 2017/0219365 A1   Aug. 3, 2017

(51) Int. Cl.
*G01C 21/34* (2006.01)
(52) U.S. Cl.
CPC ..... *G01C 21/3469* (2013.01); *G01C 21/3492* (2013.01)
(58) Field of Classification Search
CPC .................. G01C 21/3469; G01C 21/3492
See application file for complete search history.

(56) References Cited

U.S. PATENT DOCUMENTS

| | | | | |
|---|---|---|---|---|
| 2011/0184642 A1* | 7/2011 | Rotz | ................. | G01C 21/3492 701/533 |
| 2011/0307166 A1* | 12/2011 | Hiestermann | .......... | G01C 21/32 701/119 |
| 2012/0173134 A1* | 7/2012 | Gutman | ............. | G01C 21/3469 701/400 |
| 2012/0173135 A1* | 7/2012 | Gutman | ............. | G01C 21/3469 701/408 |
| 2013/0173152 A1* | 7/2013 | Schilling | ................. | H03M 7/40 701/527 |
| 2013/0204527 A1* | 8/2013 | Schilling | ................ | G01C 21/34 701/533 |
| 2015/0149078 A1* | 5/2015 | Profous | .............. | G01C 21/3446 701/426 |
| 2015/0345966 A1* | 12/2015 | Meuleau | ............ | G01C 21/3453 701/23 |

* cited by examiner

*Primary Examiner* — Jelani A Smith
*Assistant Examiner* — Majdi Alsomiri
(74) *Attorney, Agent, or Firm* — Klarquist Sparkman, LLP (57) ABSTRACT

A non-transitory computer-readable storage medium may comprise instructions stored thereon for controlling operation of a vehicle travelling from a starting location to a target location. When executed by at least one processor, the instructions may be configured to cause a computing system to generate a travel itinerary for the vehicle to travel over different road segments at respective speeds between the starting location and the target location subject to an arrival time deadline for arriving at the target location, the different road segments being selected on a map to minimize a total fuel consumption of the vehicle in travelling from the starting location to the target location, and send the travel itinerary to a vehicle operator to operate the vehicle to travel over different road segments at respective speeds between the starting location and the target location.

3 Claims, 8 Drawing Sheets

| Notation | Description |
|---|---|
| $F_i$ | Fuel consumption at speed $i$, l/km<br>$i = 1, 2, \ldots, N$  $N$ is maximum speed, km/h |
| $N_j$ | Node $j$<br>$j = 1, 2, \ldots, M$ |
| $R_{jk}$ | Road segment between node $j$ and node $k$<br>$j = 1, 2, \ldots, M$<br>$k = 1, 2, \ldots, M$ |
| $D_{jk}$ | Distance of the road segment between node $j$ and node $k$, km<br>$j = 1, 2, \ldots, M$<br>$k = 1, 2, \ldots, M$ |
| $T_h$ | Time unit $h$<br>$h = 1, 2, \ldots, L$ |
| $Ts$ | Start time |
| $Ta$ | Arrival time |
| $L$ | Time cycle normalize prp units mlem |
| $S_{hjk}$ | Average speed of the road segment between node $j$ and node $k$ at time unit $h$<br>$h = 1, 2, \ldots, L$<br>$j = 1, 2, \ldots, M$<br>$k = 1, 2, \ldots, M$ |
| $Smin_{hjk}$ | Minimum speed of the road segment between node $j$ and node $k$ at time unit $h$<br>$h = 1, 2, \ldots, L$<br>$j = 1, 2, \ldots, M$<br>$k = 1, 2, \ldots, M$ |
| $Smax_{hjk}$ | Maximum speed of the road segment between node $j$ and node $k$ at time unit $h$<br>$h = 1, 2, \ldots, L$<br>$j = 1, 2, \ldots, M$<br>$k = 1, 2, \ldots, M$ |
| $X_{jk}$ | $X_{jk} = \begin{cases} 1 & \text{if } R_{ij} \text{ is visited} \\ 0 & \text{otherwise} \end{cases}$<br>$j = 1, 2, \ldots, M$<br>$k = 1, 2, \ldots, M$ |
| $S_{jk}$ | Suggested speed between node $j$ and node $k$, km/h<br>$j = 1, 2, \ldots, M$<br>$k = 1, 2, \ldots, M$ |
| $Tc_j$ | Current time of $N_j$ |
| $Fc_j$ | Current fuel consumption of $N_j$ |
| $P_j$ | Parent node of $N_j$ |
| $Dd_{jk}$ | Direct distance from $N_j$ to $N_k$ |
| $Os$ | Open set whose nodes need to be checked |
| $Cs$ | Closed set whose nodes do not need to be checked |

TABLE 501 (Fuel Consumption)

| Column name | Description |
| --- | --- |
| Speed | km/h, speed of vehicle |
| Fuel consumption | l/km, fuel consumption of vehicle |

TABLE 502 (Road Segments)

| Column name | Description |
| --- | --- |
| Segment ID | Identity of road segment |
| Segment name | Name of road segment |
| Node A | Identity of node A |
| Node B | Identity of node B |
| Distance | km, distance between node A and node B |

TABLE 503 (Historical Traffic Data)

| Column name | Description |
| --- | --- |
| Segment ID | Identity of road segment |
| Start time | Start time of the time period |
| End time | End time of the time period |
| Average speed | Average speed of the time period |
| Minimum speed | Minimum speed of the time period |
| Maximum speed | Maximum speed of the time period |

FIG. 5

| Column name | Description |
|---|---|
| Sequence | Sequence of the path |
| Segment ID | Identity of road segment |
| Speed | Suggested speed at the road segment |
| Fuel consumption | Fuel consumption at the road segment |
| Time | Time used at the road segment |

```
1   Function optimizeFuelConsumption(Fuel, Segment, Traffic):
2   % Input:  Fuel – Relationship between speed and fuel consumption
3           Segment – Road segment info including distance
4           Traffic – Historical traffic data for each segment
5   % Output: Path – Path with speed at each segment
6     Format segments to nodes
7     Initialize input parameters including NA, NB, Ts, Ta
8     Initialize So and Sc
9     Bidirectional calculating the path in parallel, the following is from source to destination
10    So.push(NA);
11    cur_node = NA;
12    While !So.contains(NB)
13      For each node in nodes
14        If node connects with cur_node
15          So.push(node);
16          Node.parent = cur_node;
17        End if
18      End for
19      So.pull(cur_node);
20      Sc.push(cur_node);
21      For each node in So
22        If f(node)==null
23          f(node)=g(node)+h(node);
24          Update Tc and Fc;
25        End if
26      End for
27      cur_node = node with min(f(node));
28    End while
29    Compare two paths
30    Return Path.
```

SYSTEM AND METHOD FOR VEHICLE FUEL CONSUMPTION OPTIMIZATION

BACKGROUND

Global positioning system (GPS) and other navigation systems or map services (e.g., Google Maps, MapQuest, etc.) can provide road or route directions for a vehicle to go from a current location to a target destination. These navigation systems or map services may first detect the vehicle's current location, and then, with reference to geographical road maps, identify different paths or routes from the vehicle's current location to the target destination. The navigation systems and map services may present one or more of the paths or routes to the vehicle operator as suggested paths or routes for the vehicle operator to follow to go from the current location to the target destination. The suggested paths or routes may be based on calculations of travel distance (e.g., shortest route), or based on calculations of travel time (e.g. fastest route) using historical traffic conditions data for different paths and routes. However, a path identified as being the fastest route may turn out to be slower when actually used by the vehicle operator because the traffic conditions along the route may have changed.

Consideration is now being given to systems and methods for controlling a vehicle's operation while travelling from a current location to a target destination based on dynamic considerations of multiple constraints including, for example, vehicle speed and fuel economy.

SUMMARY

A computer system is used for controlling operation of a vehicle travelling from a starting location to a target location. The computer system includes a memory and a semiconductor-based processor, which form one or more logic circuits. In a general aspect, the logic circuits generate a travel itinerary for the vehicle to travel over different road segments at respective speeds from the starting location to the target location subject to an arrival time deadline for arriving at the target location. The logic circuits select the different road segments on a map to minimize a total fuel consumption by the vehicle in travelling from the starting location to the target location. The logic circuits send the travel itinerary to a vehicle operator to operate the vehicle to travel over different road segments at respective speeds from the starting location to the target location.

In an aspect, the logic circuits are configured to generate the travel itinerary by defining a road segment "Rjk" extending from a current node "j" by selecting a next node "k" on the map from amongst one or more potential next nodes and calculating a suggested vehicle speed for the road segment Rjk based on consideration of vehicle speed and fuel consumption between the current node j and the next node k.

In an aspect, the logic circuits are configured the logic circuits are configured to generate the travel itinerary for the vehicle to travel over different road segments at respective speeds from the starting location to the target location using bidirectional calculations of vehicle path and speed between the starting location and the target location. The logic circuits are configured to select one of the bidirectional calculations of vehicle path and speed, which has the least fuel consumption, for the travel itinerary from the starting location to the target location.

In an aspect, the logic circuits are configured calculate a current accumulated fuel consumption up to node j and an additional estimated fuel consumption up to next node k. The logic circuits are configured to select next node k on the map by selecting a node from one or more potential nodes that results in a minimum fuel consumption.

In a further aspect, wherein the logic circuits are configured to select next node k on the map by considering historical traffic data and dynamic traffic conditions on the road segment Rjk, and also the arrival time deadline for arriving at the target location.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

Systems and methods (collectively "navigation solution") for controlling a vehicle's operation, while travelling from a current location to a target destination, based on dynamic consideration of one or more constraints, are described herein. The constraints may, for example, include fuel consumption, arrival time deadlines, traffic conditions, vehicle type and vehicle load constraints, etc. The navigation solution may generate a planned travel itinerary satisfying the constraints (e.g., minimal fuel consumption) for the vehicle to go from its current location to the target destination. The travel itinerary may include both spatial and temporal aspects (i.e. geographical road segments, distances, turns, direction, vehicle speeds and timing, start times, halts, and end times, etc.). The planned travel itinerary may dynamically change as the vehicle travels along a planned route, for example, in response to dynamically changing traffic or road conditions.

In an example implementation, the navigation solution described herein may be used in conjunction with location or positioning systems (e.g., GPS systems, RFID systems, optical camera systems, cell tower triangulation systems, etc.) that may detect and provide information on the vehicle's location. The location or positioning systems may include self-reporting systems (telephone, internet, cell phone etc.) by which a user can enter or provide information on the vehicle's location. Location information usually does not include speed, direction, or spatial orientation.

In an example implementation, the navigation solution described herein may generate a planned travel itinerary including a planned route for the vehicle to go from its current location to the target destination. The planned route may identify road or highway distance segments ("road segments") between nodes on a map and also recommend speeds at which the vehicle could traverse each road segment when going from its current location to the target destination. Thus, a planned route may include a series of route segments between nodes, with the road segments characterized by distance and speed.

Figure 1:
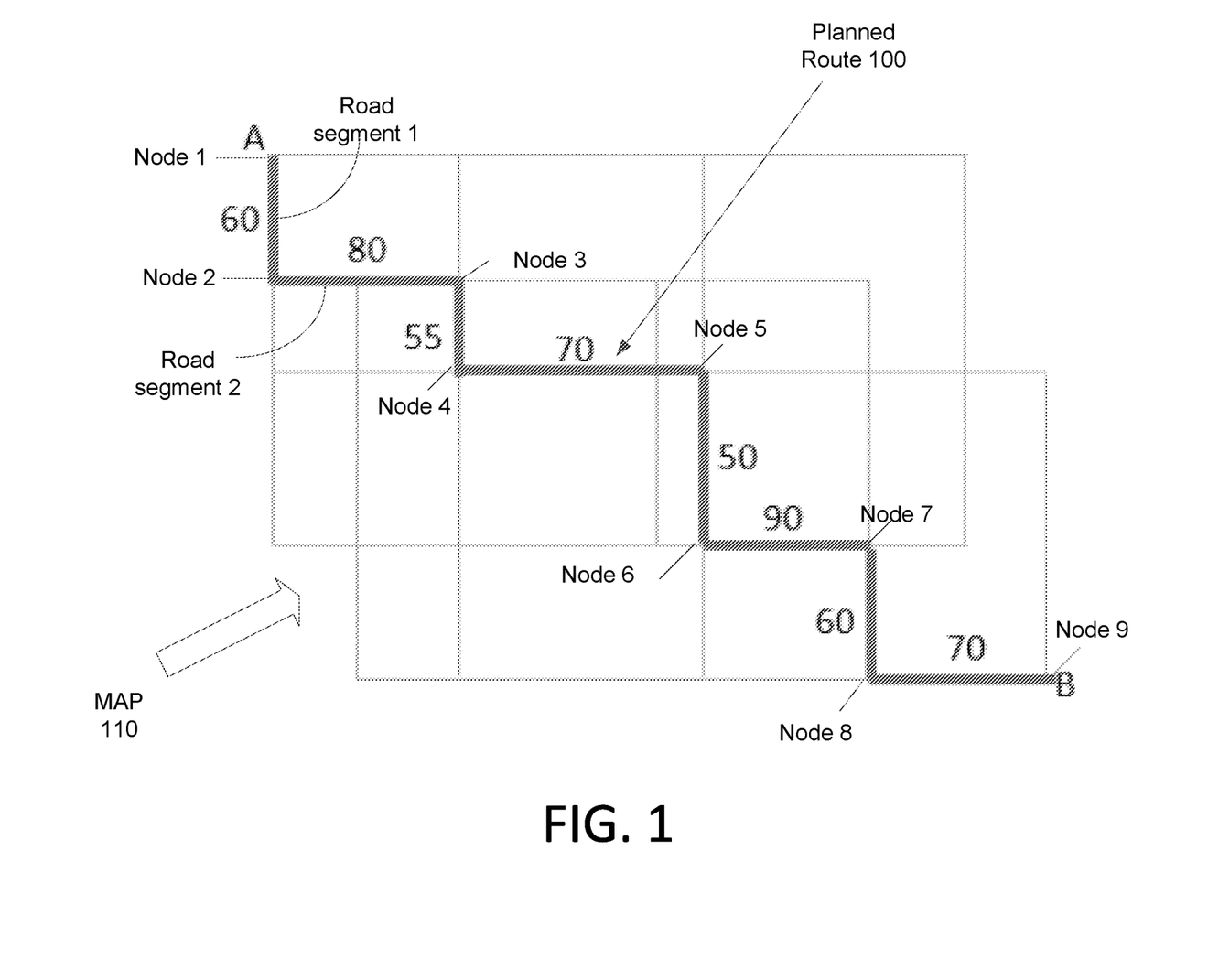
FIG. 1 is a schematic illustration of a planned route on a map for the vehicle to go from a starting location to a target location, in accordance with the principles of the present disclosure.

FIG. 1 shows, for example, a planned route 100 on a map 110 for the vehicle to go from a location "A" to a location "B." Planned route 100 may include multiple nodes (e.g., node 1, node 2, node 3, etc.) with each pair of consecutive nodes defining a road segment there between. For example, node 1 and node 2 may define a road segment 1 there between, node 2 and node 3 may define a road segment 2 there between, etc. For purposes of illustration, each of the road segments shown in FIG. 1 is annotated with a number corresponding to a recommended vehicle speed for that segment. For example, road segment 1 and road segment 2 are annotated with numbers 60 and 80 corresponding to recommended vehicles speeds for road segment 1 and road segment 2, respectively.

Figure 2:
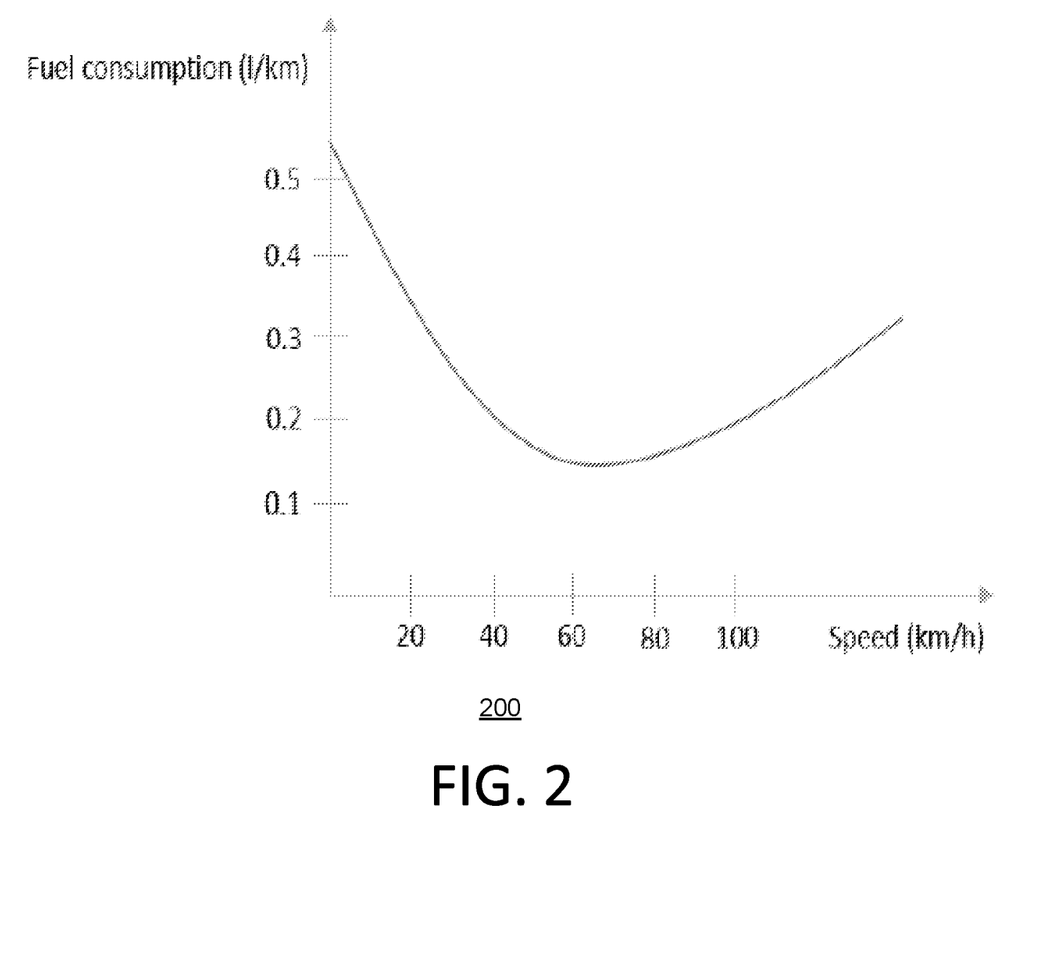
FIG. 2 is an example graph illustrating a typical fuel consumption characteristic curve for an automobile.

The recommended speeds for each segment may be based on considerations of fuel economy. Fuel consumption by a vehicle may depend on the vehicle type, vehicle load, vehicle age, vehicle condition (e.g., engine status, tire inflation, etc.). However, vehicle speed is a major determinant of fuel consumption. FIG. 2 shows a typical fuel consumption characteristic curve for an automobile. As seen from the figure, fuel consumption may be less (e.g., about 0.15 liters/km) when vehicle speed is about 60 km/hour than the fuel consumption at lower and higher vehicle speeds.

In an example implementation, the navigation solution described herein may be configured to operate the vehicle in manner that reduces fuel consumption when the vehicle has go from its current location to the target destination subject to an arrival time deadline.

Figure 3:
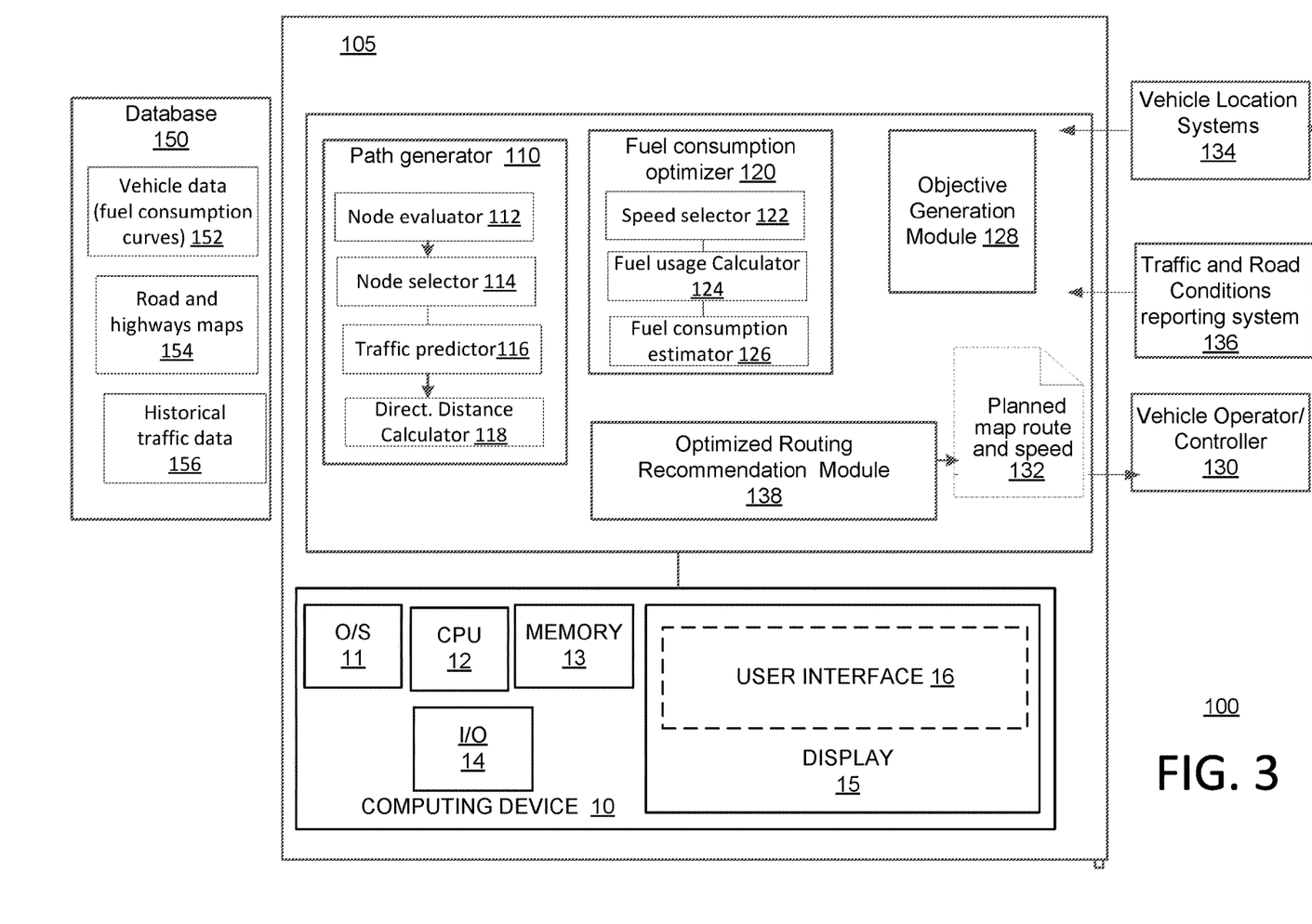
FIG. 3 is a block diagram illustration of an example system for implementing a navigation solution for controlling a vehicle's operation, while travelling from a current location to a target destination, in accordance with the principles of the present disclosure.

FIG. 3 shows an example system 100 for implementing a navigation solution for controlling a vehicle's operation, while travelling from a current location to a target destination, in accordance with the principles of the present disclosure.

System 100 may include a navigation handler 105, which may be configured to generate a planned travel itinerary (e.g., planned map route and speed instructions 132) to control operation of a vehicle for travelling from its current location (e.g., location A, FIG. 1) to a target location (e.g., location B, FIG. 1) in a fuel efficient manner through varying traffic and road conditions, subject to a arrival time deadline for reaching location B. Navigation handler 105 may send the planned map route and speed instructions 132 to a vehicle operator/controller 130 to control operation of the vehicle while travelling from location A to location B. Navigation handler 105 may include processes to iteratively search for paths (e.g., nodes, road segments) between location A and location B, which result in reduced fuel consumption.

Navigation handler 105 may be configured to receive input information, which may include, for example, the vehicle's current location from a vehicle location system 134, the target location, and the arrival time deadline. Navigation handler 105 may be coupled to a database 150, which may include vehicle data 152 (including, for example, vehicle fuel efficiency data), road and highway maps 154, and historical traffic data 156. Navigation handler 105 may also be configured to receive real-time or near real-time information on road and traffic conditions from a traffic and road conditions reporting system 136.

Navigation handler 105 may include an objective generation module 112 configured to process the input information to generate an objective function which defines the problem of travel from location A to location B with the fuel consumption and arrival time deadline constraints. Navigation handler 105 may further include a path generator 110, a fuel consumption optimizer 120 and an optimized routing recommendation module 138 configured to minimize the objective function (subject to the constraints) iteratively to generate the planned travel itinerary (e.g., planned map route and speed instructions 132). Path generator 110 may include a node evaluator 112, a node selector 114, a traffic predictor 116 and a direct distance calculator 118, which modules or processes may be configured to generate road segments for a planned route from location A to location B. Fuel consumption optimizer 120 may include processes (e.g., a speed selector 122, a fuel usage calculator 124 and a fuel consumption estimator 126), which are configured to determine fuel consumption, for example, for the road segments generated by path generator 110. Navigation handler 105/ optimized routing recommendation module 138 may be configured to dynamically update and send the planned map route and speed instructions 132 to vehicle operator/controller 130 even as the vehicle travelling from location A to location B.

In system 100, navigation handler 105 and other system components (e.g., database 150, vehicle operator/controller 130, etc.) may be hosted on one or more standalone or networked physical or virtual computing machines including computing machines that may be installed in the vehicle itself. FIG. 1 shows, for example, navigation handler 105 hosted on a computing device 10 (e.g., a desktop computer, a mainframe computer, a server, a personal computer, a mobile computing device, a laptop, a tablet, or a smart phone), which may be available to a user. Computing device 10, which includes an O/S 11, a CPU 12, a memory 13, and I/O 14, may further include or be coupled to a display 15 (including, for example, a user interface 16). Planned map route and speed instructions 132 generated by navigation handler 105 may be presented to the user, for example, on user interface 16.

Moreover, although computer 10 is illustrated in the example of FIG. 1 as a single computer, it may be understood that computer 10 may represent two or more computers in communication with one another. Therefore, it will also be appreciated that any two or more components of system 100 may similarly be executed using some or all of the two or more computing devices in communication with one another. Conversely, it also may be appreciated that various components (e.g., database 150, etc.) illustrated as being external to computer 10 may actually be implemented therewith.

Navigation handler 105 may be linked, for example, via Internet or intranet connections, to database 150, vehicle location systems 134, and traffic and road conditions reporting system 136. Further, navigation handler 105 may be linked to data sources on the web (e.g., worldwide and/or enterprise webs) and/or or other computer systems of the organization (e.g., e-mail systems, human resource systems, material systems, operations, etc.) that may have information relevant to the generation and implementation of the planned travel itinerary (e.g., planned map route and speed instructions 132) generated by navigation handler 105.

In example implementations, navigation handler 105 may be configured to generate the planned travel itinerary (e.g., planned map route and speed instructions 132) using algorithms based on an example "fuel consumption" model relating fuel consumption and travel along road segments of the route from location A to Location B.

Example Fuel Consumption Model

The fuel consumption model used by navigation handler 105 is designed to determine a planned route or path for the vehicle, which may result in minimum fuel consumption, in dynamic traffic and road conditions, subject to arrival time constraints.

A road segment in the model is defined by starting with a first node (beginning of the road segment) and then searching for and selecting a next node (end of the road segment). The number of nodes (and hence the number of road segments) in the planned route or path for the vehicle may be a variable number "n". The selection of the next node (from one or more potential next nodes) may not be determined by consideration of minimum distance alone but may include consideration of fuel consumption and traffic conditions. The length of a road segment may not be selected to simply yield the minimum distance between locations A and B because it may be possible to take a longer route (e.g., to go around traffic jams) to satisfy the arrival time constraints, and it may be possible to travel a longer route at vehicle speeds which result in better fuel efficiency than to travel a shorter route at inefficient vehicle speeds. The model may make a balanced trade-off between the arrival time (or shortest distance) and fuel consumption. Further, the model may include consideration of dynamic traffic conditions along the various road segments and account for predicted or anticipated traffic conditions along the various road segments between locations A and B.

Example Algorithm for Generating the Planned Travel Itinerary

An example iterative algorithm which may be used by navigation handler 105 to generate the planned travel itinerary (e.g., planned map route and speed instructions 132) is described below. The example algorithm may use dynamic predicted or anticipated traffic condition information (e.g., obtained from traffic and road conditions reporting system 136) in addition to arrival time constraints (e.g., obtained from a user by objective generation module 128) when selecting the next node (e.g., node 2) from amongst one or more potential next nodes to define a road segment (e.g., road segment 1). Further, the example algorithm when selecting the next node (e.g., node 2) may take into account, a current accumulated fuel consumption and the estimated fuel consumption. Further the example algorithm may be configured to calculate the planned map route and speed instructions 132 bidirectionally in parallel (i.e. from a starting node to an ending node, and in parallel, from the ending node to the starting node) to determine an optimal planned map route and speed instructions 132.

Figure 4:
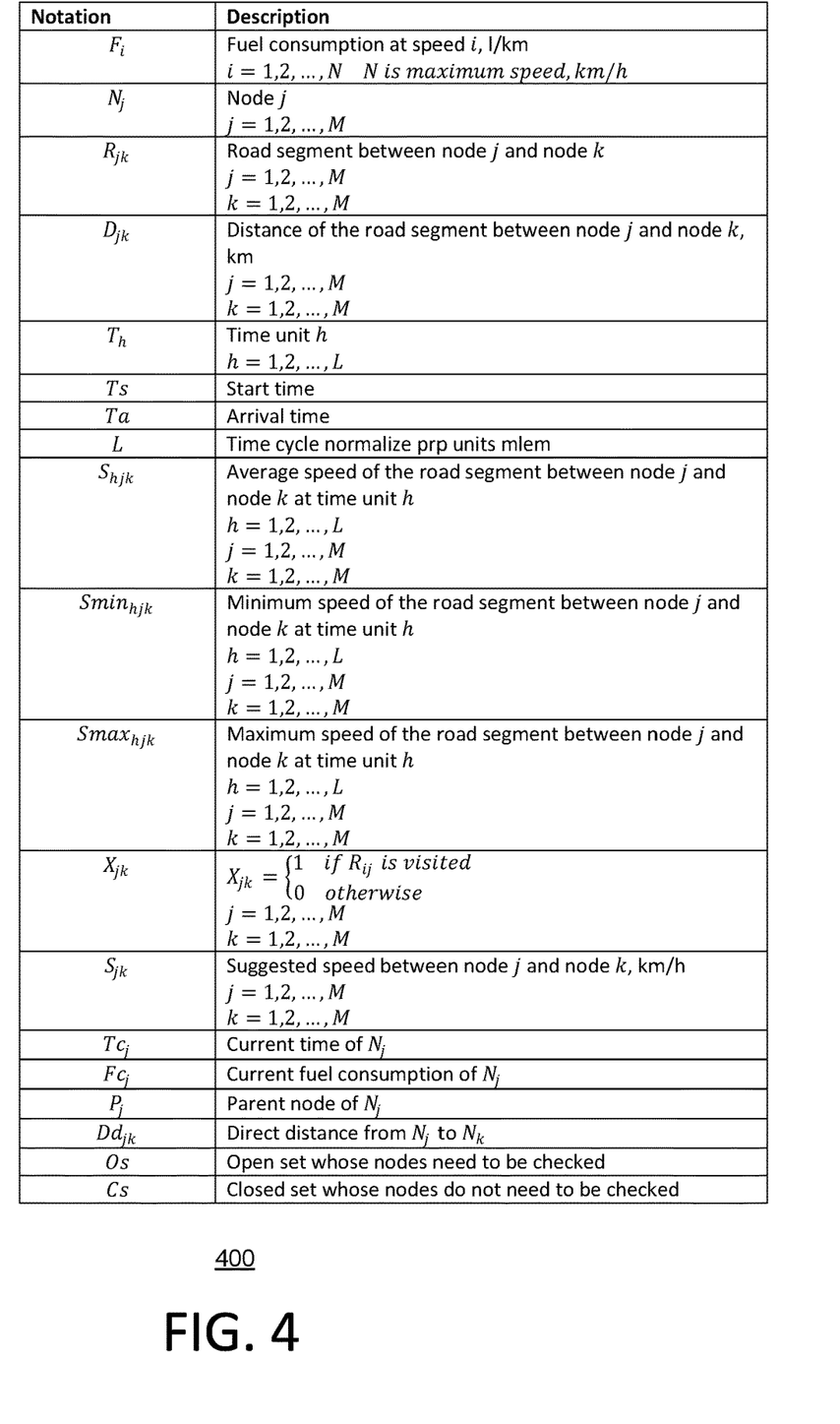
FIG. 4 is an example table, which lists terminology used herein to describe an objective function and an example algorithm.

The example algorithm may determine the planned travel itinerary (e.g., planned map route and speed instructions 132) by minimizing an objective function, which may be constructed by objective generation module 128 to describe the travel of the vehicle from a starting location to a target location. FIG. 4 shows an example table 400, which lists example terminology which may be used herein to describe the objective function and the example algorithm.

With reference to the terminology shown in table 400, for the example algorithm and the objective function, it may be assumed that the vehicle fuel efficiency curve (FIG. 1) can be discretized so that the curve can be expressed as "($F_i$, i)," where i=1, 2, . . . , N, and N is the maximum vehicle speed in the curve.

Further, it may be assumed that the number of nodes on the map in a route between the starting location (e.g., location A, FIG. 1) and the target locations (e.g., location B, FIG. 1) is equal to "M". With reference to the terminology shown in Table 400, "$R_{jk}$" represents a road segment connecting node "j" to node "k". Road segment $R_{jk}$ may have a length or distance "$D_{jk}$". For each road segment $R_{jk}$, historical traffic data (e.g., historical traffic data 156) may be available for time periods $T_h$, where h=1, 2, . . . , L. Time periods $T_h$ may, for example, be 5 minute time intervals. From the historical traffic data for time periods $T_h$, it may be possible to compute an average speed "$S_{hjk}$" (and a corresponding minimum speed "$Smin_{hjk}$" and maximum speed "$Smax_{hjk}$") historically available for the road segment road segment $R_{jk}$ at time "h".

The objective function for minimizing fuel consumption in the travel of the vehicle from a starting location to a target location subject to arrival time deadline constraint may be formulated as calculating or selecting road segments $R_{jk}$ and vehicle speeds along the road segments so that the vehicle starting at location A at a starting time "Ts" arrives at location B before an arrival deadline time "Ta" with the least amount of fuel consumption.

An example objective function (constructed, for example, by objective generation module 128) may be:

$$\text{Minimize}(\Sigma_{j=1}^{M} \Sigma_{k=1}^{M} X_{jk} F_{s_{jk}} D_{jk}),$$

subject to the following constraints:

$$\sum_{j=1}^{M} \sum_{k=1}^{M} \frac{X_{jk} D_{jk}}{S_{jk}} \leq Ta - Ts \text{ (arrival time constraint)};$$

$$\sum_{k=1}^{M} X_{Ak} = 1 \text{ (starting node is node A), and}$$

$$\sum_{j=1}^{M} X_{jB} = 1 \text{ (ending node is node B)}.$$

Figure 5:
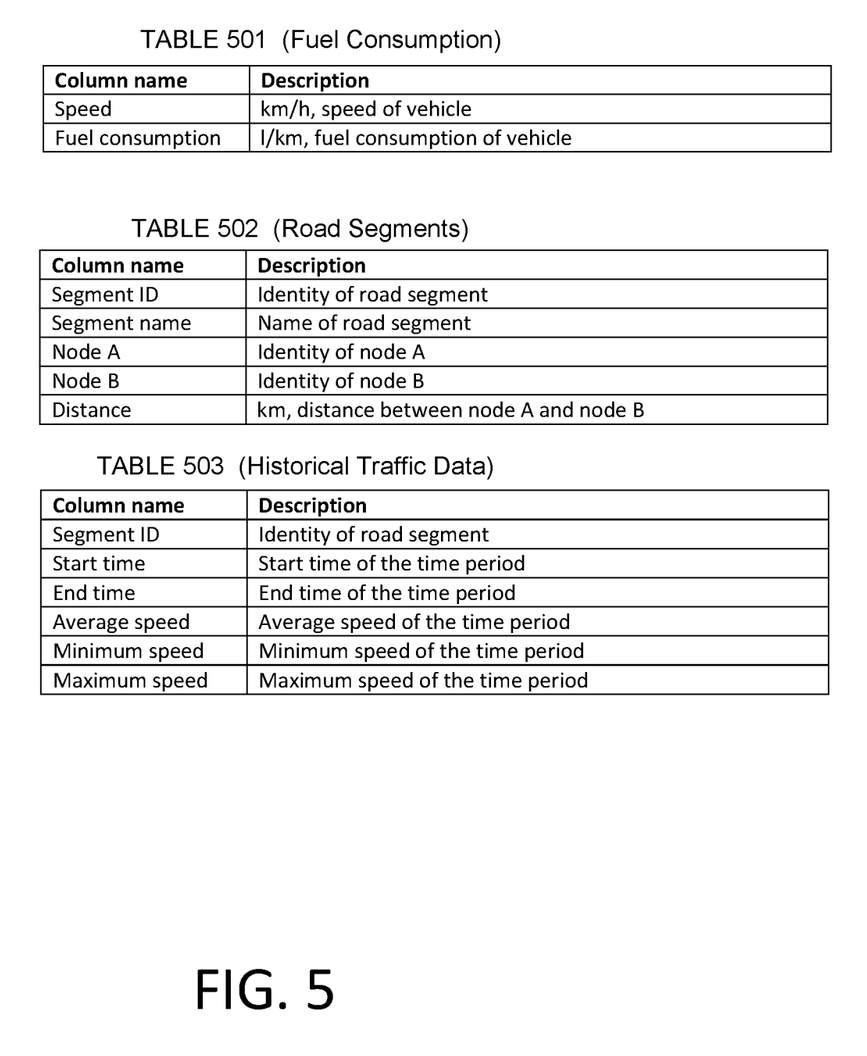
FIG. 5 includes example tables which illustrate the input data that may be available from several databases described herein.

Navigation handler 105 may be configured to minimize the foregoing objective function, in conjunction with input data, which may be available, for example, from databases vehicle data (fuel consumption curves) 152, road and highways map 154, and historical traffic data 156. FIG. 5 shows Table (Fuel Consumption) 501, Table (Road Segments) 502 and Table 503 (Historical Traffic data), which illustrate the input data that may be available from the foregoing databases 152-156. Table (Fuel Consumption) 501 may include metadata of vehicle fuel consumption (e.g., "($F_i$, i)," where i=1, 2, . . . , N, and N is the maximum vehicle speed in the curve in FIG. 1). Table (Road Segments) 502 may include metadata for all road segments (e.g., road segment ID, Road segment name, starting node j, ending node k, and length or distance between node j and node k). Table 503 (Historical traffic data) 502 may include metadata related to historical traffic data for the road segments (e.g., identity of road segment, start time, end time, average speed, minimum speed and maximum speed).

Figure 6:
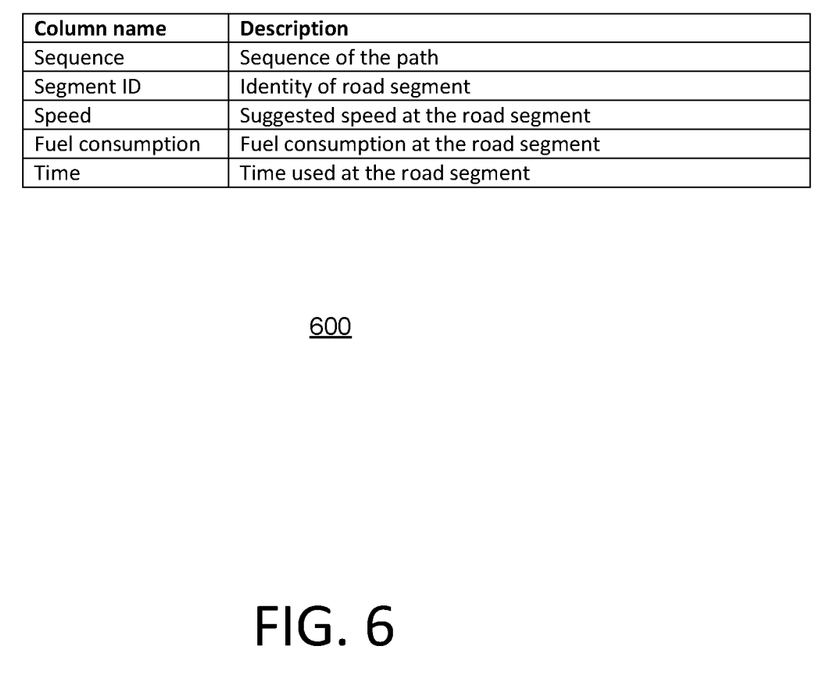
FIG. 6 is an example table, which illustrates the output data which may be included by a navigation handler in a planned travel itinerary (e.g., planned map route and speed instructions) for a vehicle, in accordance with the principles of the present disclosure.

FIG. 6 shows table 602, which illustrates output data which may be included by navigation handler 105 in the planned travel itinerary (e.g., planned map route and speed instructions 132) obtained by minimizing the objective function.

Figure 7:
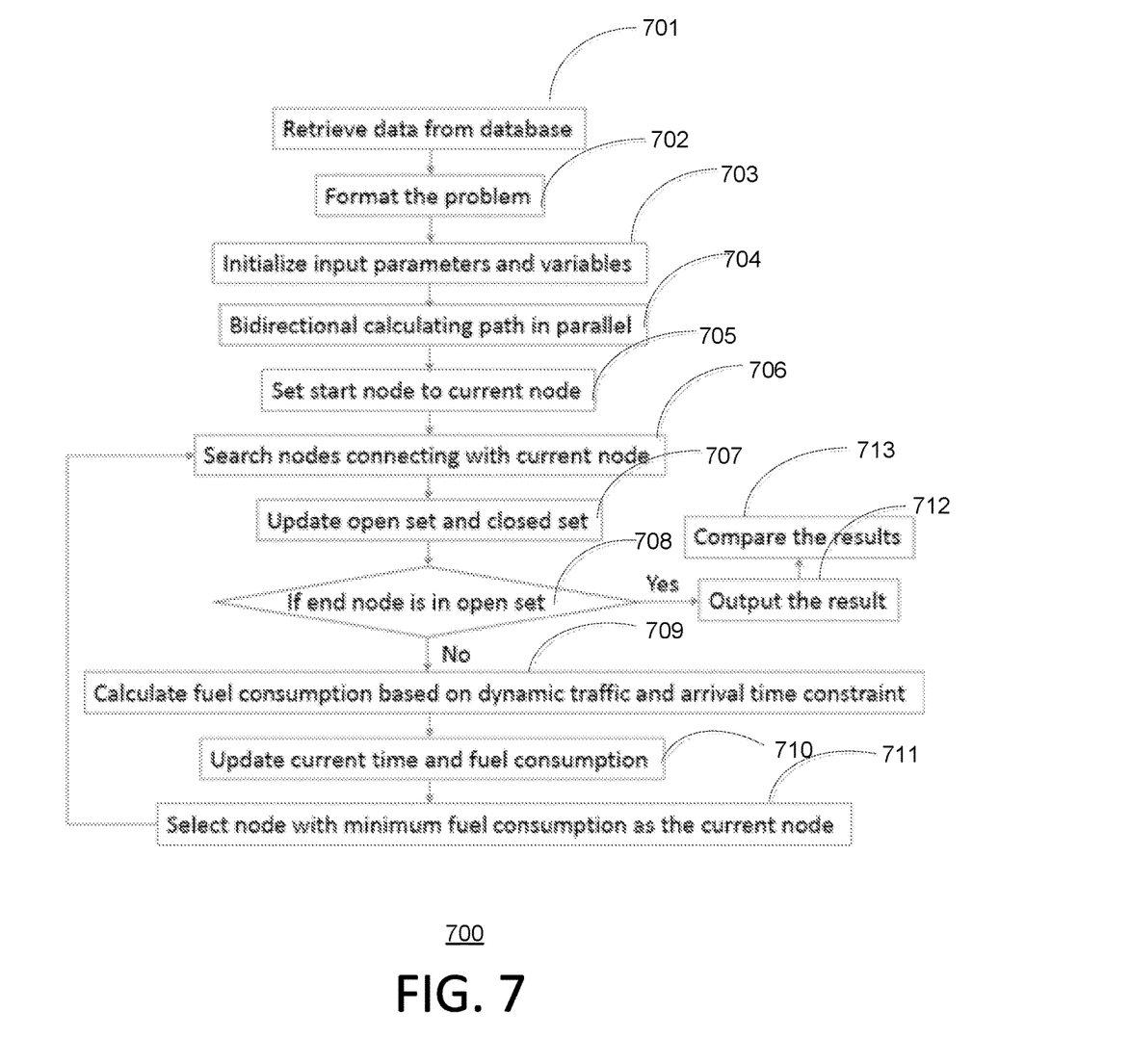
FIG. 7 is a flow chart illustrating an example method for generating a planned travel itinerary (e.g., planned map route and speed instructions) by a navigation handler, in accordance with the principles of the present disclosure.

FIG. 7 shows an example method 700 for generating the planned travel itinerary (e.g., planned map route and speed instructions 132) by navigation handler 105 (using the foregoing algorithm and objective function).

Example method 700 may be used to generate the spatial aspects of the planned map route, for example, by defining a road segment $R_{jk}$ (extending from current node j) by selecting a next node k on map 110 while calculating the vehicle speed for the road segment. In method 700, selecting the next node k may not be based only on static considerations of minimum distance, but may involve selecting next node k as a dynamic node based on consideration of varying vehicle speed and fuel consumption between the current node and the next node. Selecting next node k may involve calculating a current accumulated fuel consumption (up to node j) and the additional estimated fuel consumption (up to next node k). Further, dynamic traffic conditions and the arrival time constraints may also be considered when evaluating and selecting the next node k.

Method 700 may be performed by, or implemented using, for example, system 100 (FIG. 1).

With reference to FIG. 7, method 700 may include retrieving input data from the databases (701), formatting the data (702) and initializing input parameters and variables (703). This portion of method 700 may be performed, for example, by objective generation module 128. Retrieving input data from the databases 701 may include retrieving vehicle fuel consumption efficiency data from database 152, road segment data from database 154 and historical traffic data from database 156. Formatting the data 702 may involve formatting the data to a format suitable for processing by other components (e.g., path generator 110 and fuel consumption optimizer 120, etc.) of navigation handler 105. Initializing input parameters and variables 703 may involve initializing the input parameter and variables for a specific use instance, based, for example, on user inputs for the specific use instance. In an example implementation, the input parameter and variables may be initialized as follows:

$N_A$: Start node
$N_B$: End node
Ts: Start time
Ta: Arrival time
Tcj: Current time of $N_j$, set $Tc_A$ to Ts
$Fc_j$: Current fuel consumption of $N_j$, set $Fc_A$ to Ts to 0
$P_j$: Parent node of $N_j$
$S_{P,j}$: Speed from $P_j$ to $N_j$
Os: Open set of nodes/road segments whose selection is not confirmed and need to be evaluated
Cs: Closed set of nodes/road segments that do not need to be further evaluated After initializing input parameters and variables, method 700 may further include bidirectional calculation of the path and speed (704), which may involve calculation of the planned map route and speed starting from the current location (e.g., location A) and ending at the target location (e.g., location B), in parallel with calculation of the planned map route and speed starting from the target location (e.g., location B) and ending at current location (e.g., location A).

For brevity, FIG. 7 only shows method 700 elements (e.g., 705-710) for the calculation of the planned map route and speed starting from the current location (e.g., location A) and ending at the target location (e.g., location B). Method 700 elements for the converse in-parallel calculation of the planned map route and speed starting from the target location (e.g., location B) and ending at current location (e.g., location A) may be performed by elements that are similar to the elements shown (e.g., elements 705-710).

Method 700 elements (e.g., 705-710) for the calculation of the planned map route and speed starting from the current location (e.g., location A) and ending at the target location (e.g., location B) may be as follows:

(705): Start from $N_A$, put $N_A$ into Os,
(706): Search nodes connecting with $N_A$,
(707) Put the nodes connecting with the $N_A$ node into Os and set $N_A$ to their parent node, and move $N_A$ from Os to Cs
(708): If $N_B$ is newly added into Os, go to 712
(709): If $N_B$ is not newly added into Os, calculate the fuel consumption $c(N_j)+f(N_j)$ for each uncalculated $N_j$ in Os using the following formulas:

$c(N_j) = Fc_{P_j} + F_{S_{P_{ij}}} D_{P_{ij}}$, $S_{P_{ij}} = \{i | \text{Min}(F_i) \text{ and } S\min_{TC_{P_j}P_{ij}} \le i \le S\max_{TC_{P_j}P_{ij}}\}$, and $f(N_j) = \text{Min}(F_i) D_{jB}$ subject to the following arrival time constraint $$Tc_{P_j} + \frac{D_{P_{j,j}}}{S_{P_{j,j}}} + \frac{D_{jB}}{\{i | \text{Min}(Fi)\}} \le Ta$$

(710): Update the following variables for each newly calculated $N_j$ in Os:

$$Tc_j = Tc_{P_j} + \frac{D_{P_{j,j}}}{S_{P_{j,j}}}$$

$$Fc_j = Fc_{P_j} + F_{S_{P_{j,j}}} D_{P_{j,j}}$$

(711): Select the node with the minimum fuel consumption $c(N_j)+f(N_j)$ as the current node and go to element 705, and (712): Output the path and speed at each road segment.

Since the calculation is bidirectional, there will be two output results—a first output result for the forward direction calculation starting from the current location (e.g., location A) and ending at the target location (e.g., location B), and a second output result for the converse direction calculation starting from the target location (e.g., location B) and ending at the current location (e.g., location A). Method 700 may include comparing the first output result and the second output result (713) and selecting the better of two results for inclusion in the planned travel itinerary (e.g., planned map route and speed instructions 132).

Figure 8:
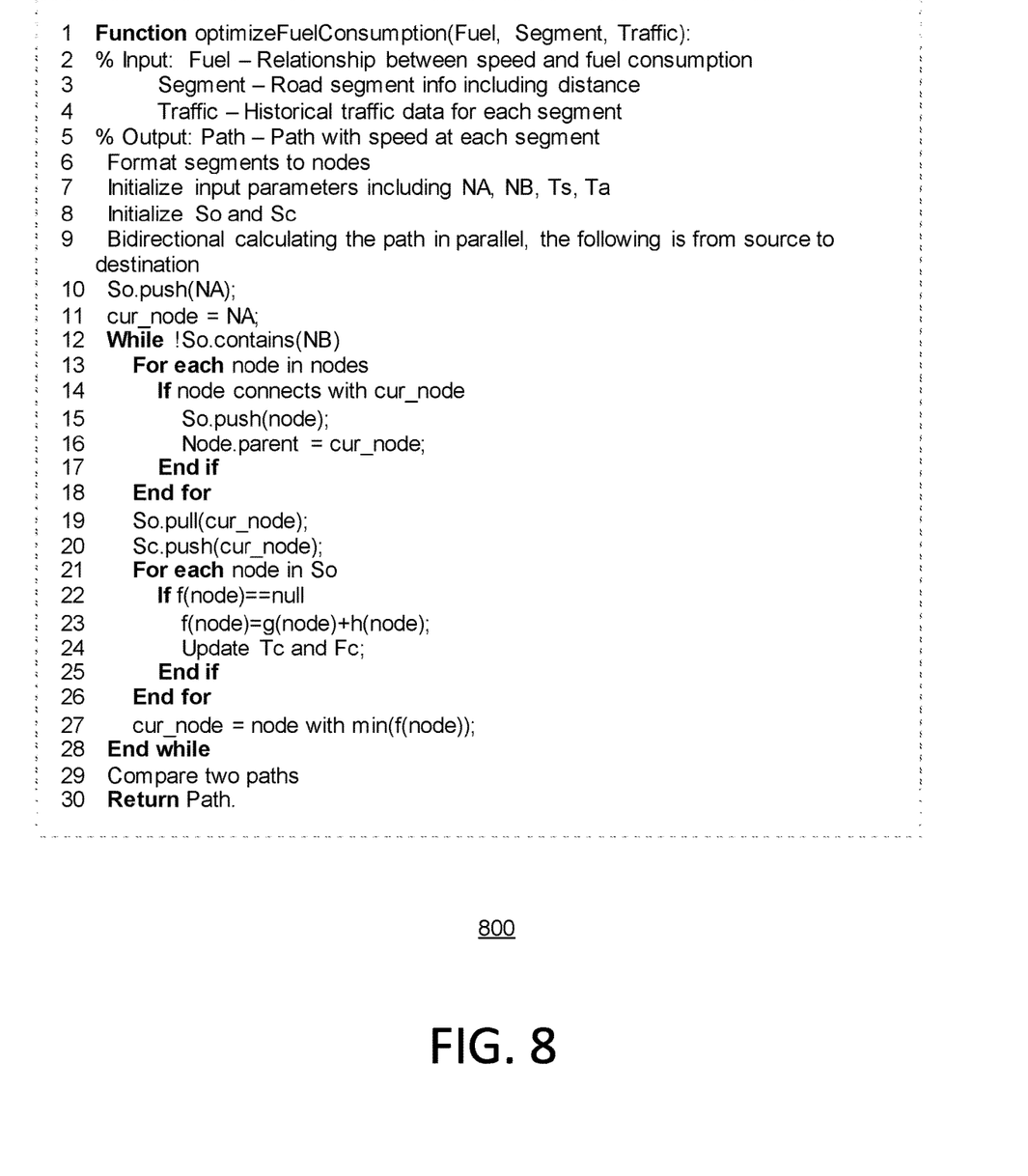
FIG. 8 is an illustration of example pseudo-code for performing the elements of the method of FIG. 7, in accordance with the principles of the present disclosure.

FIG. 8 shows example pseudo-code 800 for performing the elements of method 700 described above. Pseudo-code 800 or similar code may used, for example, to configure the modules or processes of navigation handler 105 (e.g., node evaluator 112, node selector 114, traffic predictor 116, direct distance calculator, speed selector 122, fuel usage calculator, fuel estimator 126, etc.) to implement method 700.

In example implementations, the vehicle may be configured with electronics and control systems to control operation of the vehicle. The electronics and control systems may use planned map route and speed instructions 132 to control travel of the vehicle from the starting location to the target location, for example, to achieve efficient fuel consumption.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for controlling operation of a vehicle travelling from a starting location to a target location, the method comprising:
    generating a travel itinerary for the vehicle to travel over multiple different road segments extending between respective nodes at respective speeds from the starting location (A) to the target location (B) based on simultaneous bidirectional calculations of vehicle path and vehicle speed over each segment, comprising:
        (1) add start node ($N_A$) into open set (Os);
        (2) search for connecting nodes that connect with $N_A$;
        (3) add connecting nodes that connect with $N_A$ to Os;
        (4) set $N_A$ to parent node;
        (5) move $N_A$ from Os to closed set (Cs);
        (6) if end node $N_B$ is newly added into Os, then output a first output result of a first forward direction calculation;
        (7) if end node $N_B$ is not newly added into Os, then
            (a) calculate fuel consumption for each uncalculated node ($N_j$) in Os,
            (b) update current time variable ($Tc_{cj}$) and current fuel consumption variable ($Fc_j$) for each such uncalculated node ($N_j$),
            (c) select the node with a minimum fuel consumption as a next node, and
            (d) output a first output result of a first forward direction calculation,
        (8) repeat acts (1) to (7) to output a second output result of a second reverse calculation from $N_B$ to $N_A$;
        (9) compare the first output result and the second output result, and update the travel itinerary to include the higher of the first output result and the second output result;
    wherein the multiple different road segments are selected on the map to minimize a total fuel consumption of the vehicle in travelling from the starting location (A) to the target location (B) based at least in part on each segment's distance and historical traffic data,
    wherein the travel itinerary is subject to an arrival time deadline for arriving at the target location (B) given a start time at the starting location (A);
    sending the travel itinerary to an automatic vehicle controller, the automatic vehicle controller automatically operating the vehicle to travel over the multiple different road segments of the travel itinerary at the respective speeds to minimize the total fuel consumption of the vehicle in travelling, subject to the arrival time deadline for arriving at the target location given the start time at the starting location; and
    during the travel over the travel itinerary, receiving dynamic road or traffic conditions information relating to dynamic road or traffic conditions for at least one of the multiple different road segments, and dynamically changing the travel itinerary in response.

2. A computer system for controlling operation of a vehicle travelling from a starting location to a target location, the system comprising a memory and a semiconductor-based processor, the memory and the processor forming one or more logic circuits configured to:

generate a travel itinerary for the vehicle to travel over multiple different road segments extending between respective nodes at respective speeds from the starting location to the target location (B) based on simultaneous bidirectional calculations of vehicle path and vehicle speed over each segment, comprising:
(1) add start node ($N_A$) into open set (Os);
(2) search for connecting nodes that connect with $N_A$;
(3) add connecting nodes that connect with $N_A$ to Os;
(4) set $N_A$ to parent node;
(5) move $N_A$ from Os to closed set (Cs);
(6) if end node $N_B$ is newly added into Os, then output a first output result of a first forward direction calculation;
(7) if end node $N_B$ is not newly added into Os, then
  (a) calculate fuel consumption for each uncalculated node ($N_j$) in Os,
  (b) update current time variable ($Tc_j$) and current fuel consumption variable ($Fc_j$) for each such uncalculated node ($N_j$),
  (c) select the node with a minimum fuel consumption as a next node, and
  (d) output a first output result of a first forward direction calculation,
(8) repeat acts (1) to (7) to output a second output result of a second reverse calculation from $N_B$ to $N_A$;
(9) compare the first output result and the second output result, and update the travel itinerary to include the higher of the first output result and the second output result;
wherein the multiple different road segments are selected on the map to minimize a total fuel consumption of the vehicle in travelling from the starting location (A) to the target location (B) based at least in part on each segment's distance and historical traffic data,
wherein the travel itinerary is subject to an arrival time deadline for arriving at the target location (B) given a start time at the starting location (B);
send the travel itinerary to an automatic vehicle controller, the automatic vehicle controller automatically operating the vehicle to travel over the multiple different road segments at the respective speeds to minimize the total fuel consumption of the vehicle in travelling, subject to the arrival time deadline for arriving at the target location given the start time at the starting location; and
during the travel over the travel itinerary, receiving dynamic road or traffic conditions information relating to dynamic road or traffic conditions for at least one of the multiple different road segments, and dynamically changing the travel itinerary in response.

3. A non-transitory computer readable storage medium having instructions stored thereon, including instructions which, when executed by a microprocessor, cause a computer system to:
generate a travel itinerary for the vehicle to travel over multiple different road segments extending between respective nodes at respective speeds from the starting location to the target location (B) based on simultaneous bidirectional calculations of vehicle path and vehicle speed over each segment, comprising:
(1) add start node ($N_A$) into open set (Os);
(2) search for connecting nodes that connect with $N_A$;
(3) add connecting nodes that connect with $N_A$ to Os;
(4) set $N_A$ to parent node;
(5) move $N_A$ from Os to closed set (Cs);
(6) if end node $N_B$ is newly added into Os, then output a first output result of a first forward direction calculation;
(7) if end node $N_B$ is not newly added into Os, then
  (a) calculate fuel consumption for each uncalculated node ($N_j$) in Os,
  (b) update current time variable ($Tc_j$) and current fuel consumption variable ($Fc_j$) for each such uncalculated node ($N_j$),
  (c) select the node with a minimum fuel consumption as a next node, and
  (d) output a first output result of a first forward direction calculation,
(8) repeat the above to output a second output result of a second reverse calculation from $N_B$ to $N_A$;
(9) compare the first output result and the second output result, and update the travel itinerary to include the higher of the first output result and the second output result;
wherein the multiple different road segments are selected on the map to minimize a total fuel consumption of the vehicle in travelling from the starting location (A) to the target location (B) based at least in part on each segment's distance and historical traffic data,
wherein the travel itinerary is subject to an arrival time deadline for arriving at the target location (B) given a start time at the starting location (B);
send the travel itinerary to an automatic vehicle controller, the automatic vehicle controller automatically operating the vehicle to travel over the multiple different road segments at the respective speeds to minimize the total fuel consumption of the vehicle in travelling, subject to the arrival time deadline for arriving at the target location given the start time at the starting location; and
during the travel over the travel itinerary, receiving dynamic road or traffic conditions information relating to dynamic road or traffic conditions for at least one of the multiple different road segments, and dynamically changing the travel itinerary in response.

* * * * *